United States Patent [19]

Debord et al.

[11] Patent Number: 5,344,872
[45] Date of Patent: Sep. 6, 1994

[54] INK COMPOSITIONS CONTAINING CERTAIN METHACRYLATES

[75] Inventors: Theo J. Debord; Nelson Z. Escano; Louis A. Wilkin, all of Kingsport, Tenn.

[73] Assignee: Eastman Chemical Company, Kingsport, Tenn.

[21] Appl. No.: 19,514

[22] Filed: Feb. 19, 1993

[51] Int. Cl.$^5$ .................... C08L 67/00; C08L 77/00; C08L 67/02; C08F 20/00

[52] U.S. Cl. .................... 524/513; 524/514; 525/35; 525/165; 525/166; 525/167; 525/437; 525/441; 525/443; 525/444; 525/448; 525/450; 528/272; 528/290; 528/291; 528/292; 528/293; 528/302; 528/305; 528/307

[58] Field of Search ............... 524/513, 514; 525/437, 525/441, 443, 448, 450, 166, 167, 165, 35, 444; 528/272, 293, 292, 291, 290, 302, 305, 307

[56] References Cited

U.S. PATENT DOCUMENTS

| | | | |
|---|---|---|---|
| 2,532,278 | 12/1950 | Chadwick | 260/67.5 |
| 4,704,309 | 11/1987 | Coney et al. | 427/258 |
| 4,921,899 | 5/1990 | Phan et al. | 524/513 |
| 4,946,932 | 8/1990 | Jenkins | 528/272 |
| 4,996,257 | 2/1991 | Saito et al. | 524/262 |
| 5,006,598 | 4/1991 | Adams et al. | 524/601 |
| 5,039,339 | 8/1991 | Phan et al. | 428/481 |

*Primary Examiner*—Paul R. Michl
*Assistant Examiner*—LaVonda R. DeWitt
*Attorney, Agent, or Firm*—Betty J. James

[57] ABSTRACT

This invention relates to an aqueous dispersion of a water-dissipatable polyester and a styrenated acrylic copolymer in combination with either an acrylic polymer or a hydantoin-formaldehyde resin.

44 Claims, No Drawings

INK COMPOSITIONS CONTAINING CERTAIN METHACRYLATES

CROSS-REFERENCES TO RELATED APPLICATIONS

This application is related to U.S. Ser. No. 07/909,375 filed on Jul. 6, 1992 pending and to U.S. Ser. No. 08/019,711 U.S. Pat. No. 5,274,025 filed on even date herewith, and entitled "Ink and Coating Compositions Containing A Blend of Water-Dispersible Polyester and Hydantoin-Formaldehyde Resins".

FIELD OF THE INVENTION

This invention relates to ink compositions containing blends of water-dispersible polyesters or polyamides with styrene/hydroxyethyl acrylate or styrene/hydroxyethyl methacrylate copolymer.

SUMMARY OF THE INVENTION

This invention relates to an ink composition comprising:
(A) about 60 to about 95 weight % of an aqueous dispersion comprising:
  (1) a polyester (E) consisting essentially of repeat units from about 5 to about 40% by weight of a linear, water-dissipatable polymer having carbonyloxy linking groups in the linear molecular structure wherein up to 80% of the linking groups may be carbonylamido linking groups, the polymer having an inherent viscosity of at least about 0.1 measured in a 60/40 parts by weight solution of phenol/tetrachloroethane at 25° C. and at a concentration of about 0.25 gram of polymer in 100 ml of the solvent, the polymer containing substantially equimolar proportions of acid equivalents (100 mole percent) to hydroxy and amino equivalents (100 mole percent), the polymer comprising the reaction products of (a), (b), (c) and (d) from the following components or ester forming or esteramide forming derivatives thereof:
    (a) at least one difunctional aromatic, saturated aliphatic or saturated alicyclic dicarboxylic acid;
    (b) from about 2 to about 25 mole percent, based on a total of all acid and hydroxyl equivalents being equal to 200 mole percent, of at least one difunctional sulfomonomer containing at least one metal sulfonate group attached to aromatic nucleus Wherein the functional groups are hydroxy or carboxyl;
    (c) at least one difunctional reactant selected from a glycol or a mixture of a glycol and diamine having two —NRH groups, the glycol containing two —C(R)$_2$—OH groups; and
    (d) from none to at least one difunctional reactant selected from a hydroxycarboxylic acid having one —CR$_2$—OH, an aminocarboxylic acid having one —NRH group, an aminoalcohol having one —CR$_2$—OH group and one —NRH or mixtures thereof, wherein each R is an H atom or an alkyl group of 1 to 4 carbon atoms; and
  (2) about 95 to about 60% by weight of a polymer (F) having repeat units from
    (a) about 20 to about 80% by weight of a polymer comprising repeat units from styrene or one or more derivatives of styrene;
    (b) about 15 to about 50% by weight of hydroxyalkyl (meth)acrylate; and
    (c) about 0 to about 60% by weight of alkyl (meth)acrylate, said aqueous dispersion containing about 95 to about 60% by weight of said polymer (F) and about 5 to about 40% by weight of said polyester (E), both said percentages being based-on the combined weight of polyester (E) and polymer (F); and
(B) about 5 to 40% by weight of a copolymer (G) consisting of
  (1) about 10 to 65 weight percent of polyester (E), based on the weight of B(1) or polyester (A) plus (B)(2) plus (B)(3);
  (2) an acrylic polymer in an amount of about 15 to 40 percent, based on the total weight of components (B)(1) and (B)(2), said acrylic polymer being compatible with the water-dissipatable polyester at a maximum acrylic polymer concentration of about 60/40 weight percent of the total acrylic/polyester polymer solids, and
  (3) a water-dissipatable vinyl polymer in an amount of about 20 to 60 weight percent, based on the weight of (B)(1) plus (B)(2) plus (B)(3), said vinyl polymer being compatible with the water-dissipatable polyester at a maximum vinyl polymer concentration of about 60/40 weight percent of the total vinyl/polyester polymer solids, or (c) about 5.0 to about 25.0 weight % of a hydantoin-formaldehyde resin.

DETAILED DESCRIPTION OF THE PREFERRED EMBODIMENTS

Polyester (E) or component (1)(E)(1) consists essentially of repeat units from:
(a) about 5 to about 40% by weight of a linear, water-dissipatable polymer having carbonyloxy linking groups in the linear molecular structure wherein up to 80% of the linking groups may be carbonylamido linking groups, the polymer having an inherent viscosity of at least about 0.1 measured in a 60/40 parts by weight solution of phenol/tetrachloroethane at 25° C. and at a concentration of about 0.25 gram of polymer in 100 ml of the solvent, the polymer containing substantially equimolar proportions of acid equivalents (100 mole percent) to hydroxy and amino equivalents (100 mole percent), the polymer comprising the reaction products of (1), (2), (3) and (4) from the following components or ester forming or esteramide forming derivatives thereof:
  (1) at least one difunctional aromatic, saturated aliphatic or saturated alicyclic dicarboxylic acid;
  (2) from about 4 to about 25 mole percent, based on a total of all acid and hydroxyl equivalents being equal to 200 mole percent, of at least one difunctional sulfomonomer containing at least one metal sulfonate group attached to aromatic nucleus wherein the functional groups are hydroxy or carboxyl;
  (3) at least one difunctional reactant selected from a glycol or a mixture of a glycol and diamine having two —NRH groups, the glycol containing two —CH$_2$—OH groups; and (4) from none to at least one difunctional reactant selected from a hydroxy carboxylic acid having one —CR$_2$—OH, an aminocarboxylic acid having one —NRH group, an amino-alcohol having one —CR$_2$—OH group and one —NRH or mixtures thereof, wherein each R is an H atom or an alkyl group of 1 to 4 carbon atoms.

Preferably, the glycol of Polyester (E) of component (1)(A)(1)(c) above contains some poly(ethylene glycol) to aid in its water dispersibility. When some poly(ethylene glycol) is used, the content of the sulfomonomer can be lower, which aids in flexibility of formulating the polyester.

The water dispersibility of polyester (E) is related to the weight percent of poly(ethylene glycol) and mole percent of sulfomonomer. Therefore, if the content of either is relatively low, the other should be relatively high to maintain adequate dispersibility.

The poly(ethylene glycol) need not be present in the initial reaction charge, because poly(ethylene glycol) may form in situ from decomposition products and be incorporated into the polyester chain. It is well known, for example, that diethylene glycol is formed in situ in such reactions.

It has been found that the respective concentrations of the polymeric components may be broadly about 95–60% by weight of polymer (1)(A)(2) and about 5–40% by weight of polyester (1)(A)(1), both said percentages being based on the combined weight of (1)(A)(1) and (1)(A)(2). However, the preferred concentrations are 90–75% polymer (B) and 10–25% polyester (E).

Polymer (F) or component (1)(A)(2) consists essentially of about 95 to 60% by weight of a polymer having repeat units from
(1) about 20 to about 80% by weight of a polymer comprising repeat units from styrene or one or more derivatives of styrene;
(2) about 15 to about 50% by weight of hydroxyalkyl (meth)acrylate, with the proviso that said hydroxyalkyl methacrylate is not hydroxypropyl methacrylate; and
(3) about 0 to about 60% by weight of alkyl (meth)acrylate.

The aqueous dispersion contains from about 95–60% by weight of polymer (F) and about 5–40% by weight of polyester (E), both said percentages being based on the combined weight of (E) and (F).

In the preferred form of the present invention, polyester (E) contains repeating units of a poly(ethylene glycol) of the formula H—(OCH$_2$—CH$_2$)$_n$—OH wherein n is an integer of 2 to 500. The value of n is preferably from between about 2 to about 20. The values of n and the mole percent of poly(ethylene glycol) in the polyester, if used, are adjusted such that the mole percent of poly(ethylene glycol) within the stated range is inversely proportional to the quantity of n within the stated ranges. Thus, when the mole percent is high, the value of n is low. On the other hand, if the mole percent is low, the value of n is high. It is apparent, therefore, that the weight percent (product of mole percent and molecular weight) of the poly(ethylene glycol) is an important consideration because the water dissipatability of the copolyester decreases as the weight percent poly(ethylene glycol) in the copolyester decreases. For example, if the weight of poly(ethylene glycol) is too low, the water dissipatability of the copolyester may be inadequate. Furthermore, the weight percent of poly(ethylene glycol) is preferably adjusted such that it is inversely proportional to the mole percent of the difunctional sulfomonomer because the water dissipatability of the copolyester is a function of both the mole percent sulfomonomer and the weight percent polyethylene glycol.

Examples of suitable poly(ethylene glycols) include relatively high molecular weight polyethylene glycols, some of which are available commercially under the designation "Carbowax", a product of Union Carbide. Diethylene glycol is also especially suitable.

Other useful glycols for preparing copolyester may consist of aliphatic, alicyclic and arylalkyl glycols. Examples of these glycols include ethylene glycol; propylene glycol; 1,3-propanediol; 2,4-dimethyl-2-ethylhexane 1,3-diol; 2,2-dimethyl-1,3-propanediol; 2-ethyl-2-butyl-1,3-propanediol; 2-ethyl-2-isobutyl-1,3-propanediol; 1,3-butanediol, 1,4-butanediol, 1,5-pentanediol, 1,6-hexanediol, 2,2,4-trimethyl-1,6-hexanediol; thiodiethanol. 1,2-cyclohexanedimethanol, 1,3-cyclohexanedimethanol; 1,4-cyclohexanedimethanol; 2,2,4,4-tetramethyl-1,3-cyclobutanediol; and p-xylylenediol.

The dicarboxylic acid component of the polyester are selected from aliphatic dicarboxylic acids, alicyclic dicarboxylic acids, aromatic dicarboxylic acids, or mixtures of two or more of these acids. Examples of such dicarboxylic acids, include succinic; glutaric; adipic; azelaic; sebacic; 1,4-cyclohexanedicarboxylic; phthalic; terephthalic; naphthalenedicarboxylic acid; and isophthalic acid. Terephthalic acid and isophthalic acid are preferred as the carboxylic acid component of the polyester. Cyclohexanedicarboxylic acid is also preferred.

It should be understood that use of the corresponding acid anhydrides, esters, and acid chlorides of these acids is included in the term "dicarboxylic acid."

The difunctional sulfomonomer component of the polyester may advantageously be a dicarboxylic acid or an ester thereof containing a metal sulfonate group, a glycol containing a metal sulfonate group or a hydroxy acid containing a metal sulfonate group. The metal ion of the sulfonate salt may be Na+, Li+, K+ and the like. When a monovalent alkali metal ion is used, the resulting polyesters are less readily dissipated by cold water and more readily dissipated by hot water. When a divalent or a trivalent metal ion is used the resulting polyesters are not ordinarily easily dissipated by cold water but are more readily dissipated in hot water. It is possible to prepare other salts of the polyester using, for example, a sodium sulfonate salt and an appropriate ion-exchange resin to replace the sodium ion with a different ion, and thus alter the characteristics of the polymer. The difunctional monomer component may also be referred to the difunctional sulfomonomer and is further described hereinbelow.

Advantageous difunctional sulfomonomer components are those wherein the sulfonate salt group is attached to an aromatic acid nucleus such as benzene, naphthalene, diphenyl, oxydiphenyl, sulfonyldiphenyl or methylenediphenyl nucleus. Preferred results are obtained through the use of sulfophthalic acid, sulfoterephthalic acid, sulfoisophthalic acid, 4-sulfonaphthalene-2,7-dicarboxylic acid, and their esters.

Particularly superior results are achieved when the difunctional sulfomonomer component is 5-sodiosulfoisophthalic acid or its esters, and the glycol is a mixture of ethylene glycol or 1,4-cyclohexanedimethanol with diethylene glycol.

It is preferred that the polyester have repeat units from isophthalic acid, sodiosulfoisophthalic acid, diethylene glycol, and another glycol selected from at least one of ethylene glycol and 1,4-cyclohexanedimethanol, and another polymer containing at least 20% by weight of repeat units from styrene or one or more derivatives of styrene, and 15% by weight of hydroxyalkyl (meth)acrylate, with the proviso that said hydroxyalkyl methacrylate is not hydroxypropyl methacrylate.

If desired, the styrene or styrene derivative(s) and the hydroxyalkyl (meth)acrylate of Polymer (F), as described herein, may be mixed with additional monomers which are copolymerizable with the styrene or styrene derivatives, hydroxyalkyl (meth)acrylate. The comonomers may be present in amounts from 0 to about 60 weight percent. Polymer blends in which polymer (F) contains from about 35 to about 100% of a combination of the weight percents of styrene or styrene derivatives and hydroxyalkyl (meth) acrylate as described herein are preferred. The preferred total amount of comonomers is approximately about 0–40 weight percent.

One class of suitable comonomers are acrylic and methacrylic esters. Acrylic and methacrylic acid esters having from 1 to about 20 carbon atoms in the alcohol moiety are commercially available or can be easily prepared by known esterification processes. Preferred esters are the methyl, ethyl, butyl, 2-ethylhexyl and lauryl esters.

The acrylic and methacrylic acid esters may contain additional functional groups of the alcohol moiety, such as for example, hydroxyl, amine, halogen, ester, carboxylic acid, amide, nitrile and alkyl groups. Functionalized monomers such as blocked isocyanate acrylates and methacrylates may also be used to provide crosslinking sites for the preparation of curable systems.

Also, particularly useful as comonomers are lower alkyl diesters of unsaturated dicarboxylic acids. For example, $C_{1-4}$ diesters of maleic and fumaric acids, e.g., dibutyl maleate, may be used in copolymers with styrene or styrene derivatives and hydroxyalkyl (meth)acrylate or hydroxyalkylacrylate as described herein.

Other useful comonomers include acrylonitrile, acrylic acid, maleic anhydride, fumaric acid, methacrylic acid, acetoacetoxyethyl methacrylate and the corresponding acrylate, and halogenated vinyl monomers such as vinyl chloride and vinylidene chloride. These monomers may be used individually or may be used as mixtures to provide the desired properties. The preferred ratios of the various monomers can be readily determined by one skilled in the art and are dependent upon the particular application and desired properties of the water-dispersible polyester blend.

It is preferred that polymer (F) comprise repeat units from 0 to about 80 weight % of one or more comonomers selected from the group consisting of ethylene, acrylic acid, methacrylic acid, acrylic and methacrylic acid esters, acrylamides, unsaturated dicarboxylic acid diesters, vinyl chloride and maleic anhydride.

It is more preferred that polymer (F) comprise repeat units from at least 20% by weight of one or more comonomers selected from styrene, methylmethacrylate, ethylhexylacrylate and butylacrylate.

The polymer compositions such as polymer (F) and copolymer (G) useful in the present invention are prepared in aqueous dispersions. The monomers are generally added to an aqueous dispersion of the water-dispersible polyester and polymerized by free radical initiation in conventional emulsion or suspension polymerization processes. The preferred ratio of polyester to monomer in the dispersion prior to polymerization will vary widely and depends on the intended application.

The polymerization can be initiated by a water-soluble or water-dispersible free radical initiator known in the art such as sodium persulfate, or by an oil-soluble initiator such as benzoyl peroxide. Other useful initiators include redox initiators such as sodium persulfate, potassium persulfate, ammonium persulfate, sodium metabisulfite, potassium persulfite, and sodium formaldehyde/potassium formaldehyde sulfoxylate/Fe/hydrogen peroxide. The concentration of the initiator will generally range from about 0.01% to about 0.5% based on total reaction weight.

The sulfonate-group containing polyesters which are used in the present invention typically become very viscous at concentrations above the 34 percent total solids. Thus, the reaction typically is begun with a polyester dispersion that is about 34 percent total solids or less. However, the water-dispersible polyester blend dispersions useful in the invention can be prepared at final total solids levels up to about 30 percent to 45 percent. A total solids content of about 40 percent to 45 percent is preferred. The increase in solids level is achieved during polymerization by controlling the amount of water, if any, which is added along with the monomer. By decreasing the amount of water added during the polymerization, increased total solids contents up to about 45 percent to 50 percent are possible. This increase in solids level offers significant benefits for the use of the water-dispersible polyesters of the present invention.

The copolymerization of the styrene and acrylate monomer(s) in the presence of water-dispersible polyester [polyester (E)] may be conducted batchwise, semi-batch or in a continuous manner.

In a preferred embodiment, the sulfonate group-containing polyester [polyester (E)] is prepared, generally by melt phase polymerization techniques which are well known in the art. The polymers as prepared may be directly dispersed in hot water or extended into rods and chopped into pellets. These pellets can later be dispersed in hot water if desired. An aqueous dispersion containing about 5–40 weight %, preferably from about 10 percent to 34 percent total solids, is prepared from the polyester directly. A mixture of one or more monomers and the polymerization initiators may then be added to the aqueous dispersion of the polyester and polymerization initiated to produce an aqueous dispersion. When using a persulfate initiator, for example, the polymerizations are generally conducted at temperatures of about 70° C. to about 90° C. Usually a small amount of initiator is added toward the end of the copolymerization in order to react as much of the styrene and hydroxyethyl (meth)acrylate or hydroxypropylacrylate monomers as possible. It is desirable to have less than 100 ppm of unreacted vinyl/acrylic monomer(s) in the final product and preferably less than 50 ppm unreacted monomer(s). The aqueous dispersion so produced can be prepared with total solids contents from about 10 percent to about 50 percent.

In another mode of operation, some of the aqueous polyester dispersion is added to the reaction vessel while the vinyl monomers and initiator are dispersed another portion of the polyester dispersion. After heating the reaction mixture to the desired temperature, the portion containing polyester (E), vinyl monomers and initiator is gradually added with stirring. The translucent latexes obtained have virtually no coagulum.

The ink compositions of the invention may be useful for coatings and may contain viscosity control agents, colorants, dyes, stabilizers, etc. which may be added to the aqueous dispersions to prepare specific adhesives and coatings.

The total solids content of the aqueous dispersion is controlled by the relative amounts of polymers which are used in the polymerization reaction and by the amount of water added during polymerization. As noted above, dispersions of sulfonate group-containing polymers can practically be prepared only at total solids contents up to about 34 percent. Above 34 percent, these dispersions become highly viscous and difficult to process. Higher total solids contents can be obtained by increasing the amount of monomer and decreasing the amount of polyester which are used in the polymerization reaction.

It is preferred that the solids content of the combined weight of polyester (E) and polymer (F) is about 25 to about 45 weight %.

It is also preferred that polyester (E) have a solid content of from about 5 to about 40 weight %, preferably about 10 to about 34 weight %, based on dry solids.

The specific amounts of polyester (E) and polymer (F) can be chosen by one skilled in the art depending on the specific monomers, the desired total solids content and the application for which the aqueous dispersion is intended.

These blends can be formulated by those skilled in the art so that excellent wet block resistance in overprint varnish applications as well as excellent printability, adhesion, and water-resistance in ink applications for paper, film and foil results. However, these properties are dependent on latex composition, particularly on the composition of the styrene/(meth)acrylate co- or terpolymer. The particle size of these aqueous polymer blends generally range from $\leq 300$ nm, and more preferably from about 40 nm to about 200 nm. It is believed that the hydroxyethyl (meth)acrylate or hydroxypropyl acrylate monomers are responsible for providing polymer blends with these small particle sizes. It is also believed that the hydroxyethyl (meth)acrylate or hydroxypropyl acrylate serves as a reactive cosolvent which lowers the interfacial tension between the monomer droplets and the aqueous phase, thereby lowering the monomer droplet size and consequently reducing the final particle size. The hydrophilic hydroxyethyl (meth)acrylate or hydroxypropyl acrylate may also react with the hydrophobic styrene and/or (meth)acrylate monomer units to form oligomeric surfactant molecules in situ. Such an interaction would allow a low emulsion particle size to be maintained even with a reduction in the amount of the water-dispersible polyester (i.e., primary surfactant) present in the latex. Finally, the presence of the hydroxyethyl (meth)acrylate or hydroxypropyl acrylate reduces the amount of coagulum formed during latex preparation.

The dispersions or blends according to this invention may be used by applying them as a coating to a substrate such as paper followed by drying to leave a residue of solids in the form of a coating. Alternately, a second substrate can be applied prior to drying to form a bond between the substrates.

Polymer (F) can be prepared by forming an aqueous dispersion having the components of polyester (E) and polymer (F) as described herein and polymerizing components (1)(A)(2)(a), (1)(A)(2)(b) and (1)(A)(2)(c) of polymer (F) in the aqueous dispersion, to thereby obtain an aqueous dispersion of a blend of polymers with a total solids content of up to about 50%.

The invention further comprises either component (1)(B) or component (1)(C). Component (1)(B) of the invention comprises about 5 to about 40% by weight of a copolymer (G) consisting of:

(1) about 10 to 65 weight percent of polyester (E), based on the weight of polyester (E) or component (1)(B)(1) plus component (1)(B)(2) plus component (1)(B)(3);

(2) an acrylic polymer in an amount of about 15 to 40 percent, based on the total weight of components (A) plus (B) plus (C), said acrylic polymer being compatible with the water-dissipatable polyester at a maximum acrylic polymer concentration of about 60/40 weight percent of the total acrylic/polyester polymer solids, and (3) water-dissipatable vinyl polymer in an amount of about 20 to 60 weight percent, based on the weight of (A) plus (B) plus (C), said vinyl polymer being compatible with the water-dissipatable polyester at a maximum vinyl polymer concentration of about 60/40 weight percent of the total vinyl/polyester polymer solids.

As used herein, the phrase "an amount effective to increase the block resistance or water resistance properties of . . . " means that amount of acrylic polymer that, when added to the water-dissipatable polyester, will increase the block resistance and/or water resistance of an ink composition as compared to a comparable ink composition without said acrylic polymer.

By the phase "an amount effective to increase the alcohol resistance properties of . . . " is meant that amount of vinyl polymer that, when added to a blend of water dissipatable polyester and acrylic polymer, will increase the alcohol resistance of an ink composition as compared to a comparable ink composition without said vinyl polymer. It is preferred that the water resistance of ink compositions made from the polymer blend of the present invention is at least good; more preferred is excellent. It is also preferred that the alcohol resistance is at least good. It is also preferred, concerning block resistance, that the ink compositions made from the polymer blend of the present invention do not block below about 120° F. (37.78° C.); more preferably do not block below about 140° to 220° F. (48.89° to 104.44° C.), for 5 seconds on a Sentinel Heat Sealer at 40 psi (275.79 kilopascal). Water and alcohol resistance can be determined by the procedure described in U.S. Pat. No. 4,921,899 issued May 1, 1990, incorporated herein by reference in its entirety. Block resistance can be determined by the procedure described in Example 7 of U.S. Pat. No. 5,039,339 issued Aug. 13, 1991, incorporated herein by reference in its entirety.

As used herein, the term "compatible" means that a 60/40 weight blend of acrylic/polyester polymer or vinyl/polyester polymer (or a blend with, appropriately, less acrylic polymer or less vinyl polymer) will not gel or have a significant increase in viscosity after being held at 120° F. (48.89° C.) for 24 hours or at room temperature for 14 days. By the term "gel" or "gelling" is meant that the blend is not pourable at room temperature. A significant viscosity increase after 24 hours at 120° F. (48.89° C.) is typically at least two or three times the viscosity at zero time. The acrylic polymers which are compatible at the higher acrylic concentrations of the polymer blends are preferred. For example, acrylic polymers that are compatible in acrylic concentrations up to a 60/40 weight blend of acrylic/polyester are preferred over acrylic polymers that are compatible only up to a 50/50 weight blend of acrylic/polyester. Preferred acrylic polymers are compatible at acrylic concentrations of at least 30/70 (weight blend of acrylic/polyester) (i.e., at least 30 weight percent acrylic polymer) and more preferred acrylic polymers are compatible at acrylic concentrations of at least 40/60 (i.e., at least 40 weight percent acrylic polymer). Likewise, the vinyl polymers which are compatible at the higher vinyl concentrations of the polymer blends are preferred. For example, vinyl polymers that are compatible in vinyl concentrations of up to a 60/40 weight blend of vinyl/polyester are preferred over vinyl polymers that are compatible only up to a 50/50 weight blend of vinyl/polyester. Preferred vinyl polymers are compatible at vinyl concentrations of at least 30/70 (weight blend of vinyl/polyester) (i.e., at least 30 weight percent vinyl polymer) and more preferred vinyl polymers are compatible at vinyl concentrations of at least 50/50 (i.e. at least 50 weight percent vinyl polymer).

In component (1)(B) or copolymer (G) of the present invention it is preferred that component (1)(B)(2) is present in an amount effective to increase the block resistance or water resistance properties of Polyester (E) when formulated into an ink composition; also, preferably, component (1)(B)(2) is present in an amount of about 20 percent. It is preferred that component (1)(B)(3) is present in an amount effective to increase the alcohol resistance properties of Polyester (E) and component (1)(B)(2) when formulated into an ink composition; also, preferably, component (1)(B)(3) is present in an amount of about 30 percent. Polyester (E) is present in an amount of about 10 percent to 65 percent, more preferably about 50 percent. These percentages are based on the total weight of Polyester (E), (1)(B)(2), and (1)(B)(3).

In the ink compositions of the present invention it is preferred that copolymer (G) is present in an amount of about 5 to 40 weight percent, that the colorant used is present in an amount of about 0 to 35 weight percent, and that water is present in an amount of about 35 to 95 weight percent. If the ink composition is a finished ink, it is preferred that at least about 0.5 weight percent of colorant is present. More typically, in inks, at least about 5 weight percent of colorant is present. If the ink composition contains an organic pigment, typically such an organic pigment is present in an amount of about 17.5 weight percent or less of the total composition. If the ink composition contains an inorganic pigment, typically such inorganic pigment is present in an amount of about 60 weight percent or less of the total composition.

The acrylic polymers useful in making copolymer (G) of the present invention are commercially available and/or can be made using conventional techniques known in the art. The molecular weight of the acrylic polymer is at least about 10,000 and preferred is at least about 200,000.

It is preferred that the acrylic polymer useful in component (1)(B)(2) of the present invention has an acid number of about 200 or less; more preferred is less than about 55 and most preferred is less than about 50. It is also preferred that the glass transition temperature (Tg) of the acrylic polymer is greater than about 0° C.

The acrylic polymer of component (1)(B)(2) of the present invention preferably comprises repeating units of the formula:

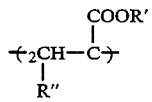

wherein R' is H, a straight, branched, or cyclic alkyl group of 1 to 20 carbon, preferably 1 to 10 carbon atoms, optionally substituted with up to 2 substituents such as $C_1$–$C_6$ alkoxy or halogen such as chloro- or bromo; and R'' is H or methyl. More preferably R' is H, methyl, ethyl, propyl, isopropyl, n-butyl, sec-butyl, isobutyl, tert-butyl, hexyl, heptyl, 2-ethylhexyl, 2-ethylbutyl, dodecyl, hexadecyl, 2-ethoxyethyl, or cyclohexyl.

The acrylic polymer of component (1)(B)(2) can optionally be styrenated and therefore further comprise repeating units of the formula:

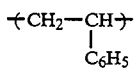

The acrylic polymer of component (1)(B)(2) can also be a copolymer containing repeating units derived from an acrylonitrile monomer.

The acrylic polymer of component (1)(B)(2) can be blended with the polyester material (polyester A) and/or vinyl polymer [component (1)(B)(3)] in pure form or either or both or all three polymers can be in a mixture with water or an aqueous solution. The mixture of the acrylic polymer and water or aqueous solution can be in the form of a water-borne alkali soluble resin, a colloidal dispersion, or emulsion. Preferred for use is an emulsion or dispersion of an acrylic polymer having a pH of about 7.5–9.0 and a Brookfield viscosity of about 200–1,000 centipoise (cp) at 25° C. Also preferred is an emulsion containing about 25–55 weight percent of acrylic polymer (more preferred about 45–50 weight percent) with the remainder of the emulsion being water or aqueous solution. If an aqueous solution is used to make the aqueous emulsion or dispersion of acrylic polymer, such emulsion or dispersions will contain one or more additives typically used in the art in amounts of to about 5 weight percent of the emulsion or dispersion, preferably about 1 to about 3 weight percent. Such additives can be emulsion stabilizers, surfactants, dispersants, antimicrobials or biocides, pH stabilizers, and the like. The additives described herein as suitable for use in the ink compositions are also suitable for use with the mixture of acrylic polymer and aqueous solution. The following Table I lists certain acrylic polymer emulsions (except for Joncryl 67 which is a solid or flake) commercially available and certain properties thereof. The acrylics having the tradename "Joncryl" are available from S. C. Johnson and Sons, Inc., Racine, Wis. 43403, U.S.A. and the acrylics having the tradename Vancryl are available from Vantage.

TABLE I

| Type | Commercial Name | % Polymer of Nonvolatile | Molecular Weight of Polymer | Acid No. of Polymer | Glass Trans. Temp. of Polymer | Min. Filming Temp. | pH of Emulsion | Viscosity of Emulsion 25° C., CPS |
|---|---|---|---|---|---|---|---|---|
| Acrylic Emulsion | Joncryl 77 | 46 | >200,000 | 55 | 21 | 20 | 8.3 | 500 |
| Styrenated Acrylic Emulsion | Joncryl 87 | 48.5 | >200,000 | 40 | 100 | >80 | 8.3 | 500 |
| Styrenated Acrylic Emulsion | Joncryl 134 | 44.0 | >200,000 | 35 | 95 | >80 | 8.3 | 200 |
| Styrenated Acrylic Emulsion | Joncryl 1535 | 37.0 | >200,000 | 30 | 20 | 15 | 7.5 | 200 |
| Acrylic Emulsion | Joncryl 537 | 46.0 | >200,000 | 40 | 44 | 42 | 9.0 | 150 |
| Styrenated Acrylic Emulsion | Joncryl 619 | 49.0 | >200,000 | 36 | 97 | 35 | 8.2 | 950 |
| Styrenated Acrylic Emulsion | Vancryl 930 | 46.0 | — | — | — | — | 8.7 | 200 |
| Acrylic Emulsion | Joncryl 74 | 48.5 | >200,000 | 50 | −16 | <5 | 8.3 | 500 |
| Solid | Joncryl 67 | 98 | 10,000 | 190 | 70 | — | — | — |

Preferably, acrylics known as under the tradename "Jonrez" are used in this invention. The "Jonrez" acrylics are commercially available from Westvaco Chemical Division in Jacksonville, Fla. Jonrez 2050 is particularly preferred.

The water-dissipatable vinyl polymers of component (1)(B)(3) useful in the present invention are commercially available and/or can be made using conventional techniques known in the art. The vinyl polymers of component (1)(B)(3) useful in the present invention comprise repeating units of the formula:

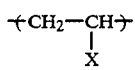

wherein X is halo. The term "halo" as used herein means Cl, Br, or F. It is most preferred that X is Cl.

The weight average molecular weight of the vinyl polymer is preferably about 4,000–50,000. The preferred glass transition temperature (Tg) of the vinyl polymer is about 0°–100° C. In addition, the vinyl polymer preferably contains about 20–50 weight percent halide.

The vinyl polymer [component (1)(B)(3)] can optionally contain repeating units of ethylene, vinyl acetate, acrylic acid, acrylamide, esters of acrylic acid, substituted acrylamide, and the like. Accordingly, preferred vinyl polymers also comprise repeating units such as of the formulas:

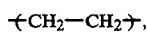

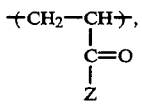

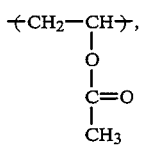

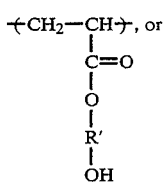

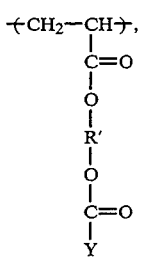

wherein Z is $NH_2$ or OH; R' is as described hereinabove; and Y is a polycarboxylic acid-containing $C_1$ to $C_{20}$ alkyl chain. Also, the vinyl polymer can optionally be substituted with hydroxyl groups on the polymer backbone.

If a mixture of the vinyl polymer is used with water or an aqueous solution, it can be in the form of suspension, dispersion, or emulsion. Preferred for use is an emulsion or dispersion of a vinyl polymer having a pH of about 5–9, a Brookfield viscosity of about 25–4000 cp at 25° C. (more preferred is about 25–2000 cp). Also preferred is a dispersion or emulsion of vinyl polymer containing about 25–60 weight percent of vinyl polymer (more preferred is about 45–55 weight percent) with the remainder of the dispersion being water or an aqueous solution. If an aqueous solution is used to make the aqueous dispersion or emulsion of vinyl polymer, such dispersion or emulsion will contain one or more additives typically used in the art in amounts up to about 5 weight percent of the emulsion or dispersion, preferably about 1 to about 3 weight percent. Such additives can be the same as used in the dispersion or emulsion of acrylic polymer. The following Table II lists certain vinyl polymer dispersions or emulsions commercially available and certain properties thereof. The vinyl polymers having the trade name "Airflex" are available from Air Products and Chemicals, Inc., Allentown, Pa. 18105, U.S.A.; and the vinyl polymers having the trade name "UCAR" are available from Union Carbide Corporation, Danbury, Conn. 06817-0001, U.S.A.

TABLE II

| Type | Commercial Name | Non Volatiles | Glass Trans. Temp. | pH of Emulsion | Viscosity % of Emulsion 25° CPS |
|---|---|---|---|---|---|
| Ethylene-Vinyl Chloride Emulsion | Airflex 4500 | 50 | 0 | 7-9 | 25-150 |
| Ethylene-Vinyl Chloride Emulsion | Airflex 4514 | 50 | 14 | 7-9 | 25-150 |
| Ethylene-Vinyl Chloride Emulsion | Airflex 4530 | 50 | 30 | 30 | 25-150 |
| Ethylene-Vinyl Chloride Emulsion | Airflex 7522 Dev | 48 | 22 | 5-6 | 150-400 |
| Waterborne Vinyl Dispersion | UCAR 31 AW-100 | 60 | | 6.7-7.7 | 2000 |

Of course, it is contemplated that two or more polyester materials, two or more vinyl polymers, and/or two or more acrylic polymers can be used in the present invention. The water-dissipatable polyester is Polyester (E) as described herein.

The aqueous solution or dispersion of water-dissipatable polyester to be blended with the acrylic polymer dispersion and/or vinyl polymer dispersion preferably comprises about 26 to 38 weight percent of polyester material (Polyester A) with the remainder being water or an aqueous solution. The aqueous solution can be the same or be similar to the aqueous solution used to make the aqueous dispersion or emulsion of acrylic polymer, with the amount of additives being present in an amount of up to about 5 weight percent, preferably about 1 to about 3 weight percent.

The hydantoins useful in component (1)(C) of this invention are described in col. 2, lines 1-29 of U.S. Pat. No. 2,532,278, hereby incorporated by reference in its entirety. Preferred hydantoins useful in the present invention are 5,5-dialkylhydantoins of the general formula:

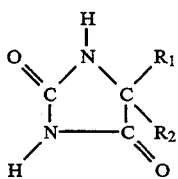

wherein $R_1$, and $R_2$ are hydrogen or monovalent aliphatic or cycloaliphatic groups such as methyl, ethyl, ethoxy ethyl, cyclohexyl, keto-cyclohexyl, and the like. Alternatively, $R_1$ may he hydrogen and $R_2$ may be any hydrogen or monovalent aliphatic or cycloaliphatic groups such as the cycloaliphatic groups previously described herein. $R_1$ and $R_2$ may also together form a divalent aliphatic or cycloaliphatic group as in the 5-disubstituted hydantoin derived from cyclohexanone, or cyclopentanone. However, it is generally preferred to use the 5,5-dialkyl hydantoin, more preferably, 5,5-dimethyldantoin because this hydantoin is easily made by reacting acetone cyanhydrin with ammonium carbonate.

Hydantoin-formaldehyde resins are generally prepared by the reaction of formaldehyde (or formalin solution) with a hydantoin as described by Jacobson in U.S. Pat. No. 2,155,863 and by Chadwick et al. in U.S. Pat. No. 2,532,278. A preferred process is the process disclosed by Chadwick et al. in U.S. Pat. No. 2,532,278, in which each mole of hydantoin is reacted with between 1.05 and 1.30 moles of formaldehyde in the presence of buffer salts. More particularly, formaldehyde and a hydantoin are brought together in the presence of a buffer salt taken from the group consisting of alkali metal salts of aliphatic mono- and di-carboxylic acids containing not to exceed 5 carbon atoms, alkali metal salts of boric acid and alkali metal salts of phosphoric acid; the salt being present in a sufficient that the initial pH is not less than 5. Although not essential, it is preferred that an iron deactivator, for example, an alkali metal phosphate be present in the reaction mass.

Examples of buffer salts are as follows: Sodium and potassium acetate, sodium and potassium propionate, sodium and potassium butyrate, sodium and potassium succinate, sodium tetraborate (borax) and trisodium phosphate. The buffer salt functions as a catalyst for the reaction. The rate of the reaction may be controlled to a considerable extent by varying amount of buffer salt used. This control of reaction time is important for manufacturing purposes because too long a reaction time may decrease the yield of the product, and too fast a reaction time makes the process difficult to handle on a large scale. It is, therefore preferred that the buffer salt be used in a concentration of between 0.1% and 2.0%, based on the weight of the hydantoin. The quantity of the buffer salt will depend somewhat upon the particular buffer used. In any event, the buffer salt should be present in sufficient quantity that the initial pH value of the mixture is at least 5. Moreover, the particular buffer salt used will determine to some extent the nature of the resulting resin, i.e., its melting point, molecular weight, etc. In a preferred of making the hydantoin-formaldehyde resin, the hydantoin, formaldehyde, and catalyst are brought together in the proportion of about 1 mole of the hydantoin to 1.05 to 1.30 moles formaldehyde and 0.1% to 2.0% of the catalyst, based on the weight of the hydantoin. The mixture is then heated to evaporated water and excess formaldehyde until the temperature reaches 120° C. to 140° C. Air is then passed through the mixture at a temperature of 120° C. to 160° C. until resin of the desired softening point is obtained. In the case of the production of a high melting point, is sometimes necessary to raise the temperature to 170° C. to 180° C. toward the end of the reaction period to keep the product fluid.

The reaction of a hydantoin with formaldehyde as described by Chadwick et al. yields a resin mixture of indefinite structure that varies with reaction conditions, final reaction temperature, catalyst and the ratio of formaldehyde to hydantoin employed. A typical segment of resinous mixture may be represented by the following structure:

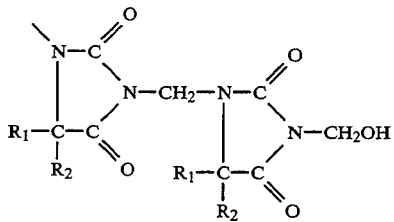

One may expect some reaction through the other amines.

Preferred hydantoin-formaldehyde resins have an initial softening point of at least 60° C. Even more preferred resins are condensation products of 5,5-dimethylhydantoin and have an initial softening point of at least 70° C. Hydantoin compounds useful within the scope of this invention are commercially available materials, such as HVWT 10 Clear Resin from Lawter International, Inc., 990 Skokie Blvd., Northbrook, Ill. 60062, or Dantoin DMF Resin from Lonza, 17—17, Route 208, Fair Lawn, N.J. 07410, may be used.

In a preferred embodiment of the invention, the ink composition comprises an acetylenic surfactant. The acetylenic surfactant is preferably present in the ink composition in amount of 0–3.0 weight percent. The acetylenic surfactant useful within the context of this invention preferably contains an acetylenic moiety of the structure —C≡C—. More preferably, the acetylenic surfactant is one or a mixture of compounds of the formula $R^1$—C≡$R^2$ wherein $R^1$ is selected from straight and branched alkyl of 1–15 carbons and $R^2$ is selected from H or straight and branched chain alkyl of 1–15 carbons, wherein at least one of $R^1$ and $R^2$ carries from 1–3 hydroxyl groups wherein the H of each said hydroxyl group is independently unsubstituted or substituted with a substituent of the formula

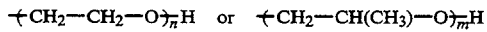

wherein n and m are each from 1 to about 50 and the total of these substituents present is such that the total of n and m is less than about 60, wherein each of n and m preferably is from about 3 to about 35.

Examples of suitable acetylenic surfactants useful in the present invention include, but are not limited to, 2,4,7,9-tetramethyl-5-decyn-4,7-diol; 3,5-dimethyl-1-hexyn-3-ol; and 3,6-dimethyl-4-octyne-3,6-diol, as well as various ethylene oxide adducts of these compounds. Suitable acetylenic surfactants can be prepared by techniques known in the art or can be obtained through commercial sources. For example, the SURFYNOL surfactants available from Air Products and Chemicals, Inc., of Allentown, Pa. are suitable acetylenic surfactants for use in the present invention. Certain commercial preparations of acetylenic surfactants may contain solvents, other surfactants and other additives such as 2-ethylhexanol, ethylene glycol, 2-butoxyethanol, amorphous silica, propylene glycol, isopropyl alcohol and the like. Examples of specific SURFYNOL surfactants include SURFYNOL 104, 104A, 104H, 104BC, 104S, 104PG, 136, PC, SE, TG, TG-E, 61, 82, 82S, OP340, OP350, and 485. They also include Surfynol 104PA, a blend of 2,4,7,9-tetramethyl-5-decyn-4,7-diol and isopropanol; Surfynol 420, Surfynol 104E, a blend of 2,4,7,9-tetramethyl-5-decyn-4,7-diol and ethylene glycol; Surfynol GA, a blend of 2,4,7,9-tetramethyl-5-decyn-4,7-diol and 1,2-ethanol; Surfynol 420, Surfynol 440 and Surfynol 465, all of which are ethoxylated tetramethyldecyndiol (reaction products of ethylene oxide with 2,4,7,9-tetramethyl-5-decyn-4,7-diol with varying degrees of ethoxylation).

Other commercially available acetylenic surfactants and formulations thereof useful in the present invention include RESOLV surfactants, available from Valchem Polymers and American Carbonyl, Inc., Garfield, N.J.

Other useful surfactants include Mazawet DF sold by Mazer Chemicals, a division of PPG Industries, Inc., Gurnec, Ill., and Pluronic V-60 which is a polyoxyalkylene derivative of trimethylolpropane sold by Rohm & Haas Company in Philadelphia, Pa. Other useful surfactants include Triton CF10 surfactant which is an alkylaryl polyether surfactant, Triton N-101 surfactant which is a nonylphenoxy polyethoxyethanol surfactant, Triton X-100 and X-405 surfactants which are octylphenoxy polyethoxy ethanol surfactants. Fluorad 430 surfactant, a fluorinated alkyl ester sold by Minnesota Manufacturing and Mining (3M), Minnesota, Triton X-15 which is an oxyphenoxy polyethoxyethanol, Silwet Surfactant L7602, a polyalkyleneoxide modified polydimethyl siloxane sold by Union Carbide of Connecticut, Pluracol V-10, a polyoxyalkylene derivative of trimethylol propane.

The ink compositions can optionally contain up to about 10 weight percent, preferably up to about 3 weight percent, of one or more additives, such as waxes, biocides, defoamers, clays and the like, if desired. Such additives include waxes such as Jonwax 26, Jonwax 120 (available from S. C. Johnson and Sons, Inc., Racine, Wis. 43403, U.S.A.) or Vanwax 35 (available from Vantage, Garfield, N.J. 07026); surfactants such as the Surfynols described previously herein; modifiers (for example, defoamers) such as WBT-409, Resolv, described previously herein, TO-70 aerosol (available from McIntyre, Chicago, Ill. 60632), Foamaster 111 (available from Henkel Corporation, Morristown, N.J. 07960); alcohols such as n-propyl alcohol, isopropyl alcohol, propylene glycol, ethylene glycol, monobutyl ether, or ethylene glycol, monobutyl ether, or ethylene glycol; glycerine; biocides; pH stabilizers, dispersants, thickeners such as Acrysol RM-825 (available from Rohm & Haas, Philadelphia, Pa. 19105); and the like.

As appreciated in the art, the exact components and properties of components desired for a given ink can vary, and, therefore, routine experimentation may be required to determine the optimal components and proportions of components for a given application and desired properties. Other additives such as waxes, biocides, defoamers, clays and the like may be used in the present inks if desired for known effects. The pigments useful in the present invention, in addition to those specifically identified below, include those described in NPIRI Raw Materials Data, Volume 4, Pigments, ©1983.

Viscosities of the present inks may vary widely according to application. For gravure printing, viscosities of press ready inks are typically from 15 to 30 seconds as measured in a #2 Zahn cup according to ASTM D-4212-82, while for flexographic printing, viscosities are typically from 25 seconds to 60 seconds. The inks are typically manufactured in more concentrated forms and are reduced to the proper printing concentration with water and/or with an unpigmented ink containing all components of the ink except the pigment. The unpigmented ink is called extender. The ink concentrate is typically diluted to the proper strength with extender, then is diluted to the proper viscosity with water.

It is preferred that the inherent viscosity of the polymeric material be from about 0.28 to about 0.38, and that said material be comprised of (a) an acid component (moiety) of from about 75 to about 84 mole % isophthalic acid and conversely from about 25 to about 16 mole % 5-sodiosulfoisophthalic acid, and (b) a glycol component (moiety) of from about 45 to about 60 mole % diethylene glycol and conversely from about 55 to about 40 mole % 1,4-cyclohexanedimethanol or ethylene glycol or mixtures thereof, and wherein the weight ratio of pigment material to said polymeric material be from about 1/10 to about 2/1. The term "moiety" as used herein with regard to the polymeric material designates the residual portion of the reactant acid or glycol which actually enters into or onto the polymer chain during the condensation or polycondensation reaction.

Further preferred embodiments of the invention are as follows:

(1) the said acid component (moiety) of the polymeric material comprises from about 80 to about 83 mole % isophthalic acid and conversely from about 20 to about 17 mole % 5-sodiosulfoisophthalic acid, and the said glycol component (moiety) comprises from about 52 to about 56 mole % diethylene glycol and conversely from about 48 to about 44 mole % 1,4-cyclohexanedimethanol;

(2) in the acetylenic surfactant, $R^1$ is other than H;

(3) the polymeric material comprises from about 4 to about 30, most preferably from about 10 to about 25 weight %, the pigment material comprises from about 1 to about 20, most preferably from about 8 to about 15 weight % the water comprises from about 55 to about 90, most preferably from about 65 to about 75 weight %, and the total acetylenic surfactant comprises from about 0.05 to about 10, most preferably from about 0.1 to about 7 weight %;

The present invention is not limited to any type of dye, pigment, filler, or the like, all of which are hereinafter included in the term "colorant," and can accommodate any colorant which can be dispersed, milled, mixed, blended or dissolved in any manner in either the polymer blend, water or aqueous polymer system.

By the term "ink composition", water-based inks, ink overprints and ink primers are collectively intended within the context of this invention.

Exemplary useful C.I. pigments for use in the present invention are given in the following table:

| Pigments | |
|---|---|
| Generic Name | C.A. Index/Chemical Name |
| C.I. Pigment Yellow 17 | Butanamide, 2,2'-[(3,3'-dichloro[1,1'-bipehnyl]4,4'-diyl)bis(azo)bis[N-(2-methoxypehnyl)-3-oxo- |
| C.I. Pigment Blue 27 | Ferrate (4-1), hexakis(cyano-C)-ammonium iron (3+) (1:1:1) |
| C.I. Pigment Red 49:2 | 1-Naphthalenesulfonic acid, 2-[(2-hydroxy-1-naphthalenyl)azo]-, calcium salt (2:1) |
| C.I. Pigment Red 81:1 | Benzoic acid, 2,-[6-ethyl-amino)-3-(ethylimino)-2,7-dimethyl-3H-xanthen-9-yl-]-,ethyl ester, w/molybdenum tungsten hydroxide oxide phosphate |
| C.I. Pigment Red 81:3 | Benzoic acid, 2-[6-ethyl-amino)-3-ethylimino)-2,7-dimethyl-3H-xanthen-9-yl-]-, ethyl ester, molybdatesilicate |
| C.I. Pigment Red 81:x | Benzoic acid, 2-[6-(ethyl-amino)-3-(ethylimino)-2,7-dimethyl-3H-xanthen-9-yl-]-, ethyl ester, molybdatephosphate |
| C.I. Pigment Yellow 83 | Butanamide, 2,2'-[(3,3'-dichloro[1,1'-biphenyl]-4,4'-diyl)bis(azo)bis[N-(4-chloro-2,5-dimethoxyphenyl)-3-oxo- |
| C.I. Pigment Red 57:1 | 2-Naphthalenecarboxylic acid, 3-hydroxy-4-[(4-methyl-2-sulfophenyl)azo-]-, calcium salt (1:1) |
| C.I. Pigment Red 49:1 | 1-Naphthalenesulfonic acid, 2-[(2-hydroxy-1-naphthalenyl)azo]-, barium salt (2:1) |
| C.I. Pigment Violet 23 | Diindolo[3,3',2'm]triphenodioxazine, 8,18-dichloro-5,15-diethyl-5,15-dihydro- |
| C.I. Pigment Green 7 | C.I. Pigment Green 7 |
| C.I. Pigment Blue 61 | Benzenesulfonic acid, [[4-[[4-phenylamino)-phenyl]-[4-(phenylimino)-2,5-cyclohexadien-1-ylidene]methyl]-phenyl]amino]- |
| C.I. Pigment Red 48:1 | 2-Naphthalenecarboxylic acid, 4-[(5-chloro-4-methyl-2-sulfophenyl)azo]-3-hydroxy-, barium salt (1:1) |
| C.I. Pigment Red 52:1 | 2-Naphthalenecarboxylic acid, 4-[(4-chloro 5-methyl-2-sulfophenyl)azo]-3-hydroxy-, calcium salt (1:1) |
| C.I. Pigment Violet 1 | Ethanaminium, N-[9-(2-carboxyphenyl)-6-(diethylamino)-3H-xanthen-3-ylidene]-N-ethyl-, molybdatetungstatephosphate |
| C.I. Pigment White 6 | Titanium oxide ($TiO_2$) |
| C.I. Pigment Blue 15 | Copper, [29H, 31H-phthalocyaninato (2-)-$N^{29}$, $N^{30}$, $N^{31}$, $N^{32}$]-, (Sp-4-1)- |
| C.I. Pigment Yellow 12 | Butanamide, 2,2'-[(3,3'-dichloro[1,1'-biphenyl]-4,4'-diyl)bis(azo)]bis[3-oxo-N-phenyl- |
| C.I. Pigment Blue 56 | Benzenesulfonic acid, 2-methyl-4-[[4-[[4-[(3-methylphenyl)amino]phenyl]-[4-[(3 methylphenyl)-imino]-2-5-cyclohexadien-1-ylidene]methyl]-phenyl]amino]- |
| C.I. Pigment Orange 5 | 2-Naphthalenol, 1-[(2,4-dinitrophenyl)azo]- |
| C.I. Pigment Black 7 | Carbon black |
| C.I. Pigment Yellow 14 | Butanamide, 2,2'-[(3,3'-dichloro[1,1'-biphenyl]-4,4'-diyl)bis(azo)]bis-[N-(2-methylphenyl0-3-oxo- |
| C.I. Pigment Red 48:2 | 2-Naphthalenecarboxylic acid, 4-[(5-chloro-4-methyl-2-sulfophenyl)-azo]-3-hydroxy-, calcium salt (1:1) |
| C.I. Pigment Blue 15:3 | Copper, [29H, 31H phthalocyaninato (2-)-$N^{29}$, $N^{30}$, $N^{31}$, $N^{32}$]-, (SP-4-1)- |
| C.I. Pigment Yellow 1 | Butanamide, 2-[(4 methyl-2-nitrophenyl)azo]-3-oxo-N-phenyl- |
| C.I. Pigment Yellow 3 | Butanamide, 2-[(4-chloro-2-nitrophenyl)azo]-N-(2-chlorophenyl)-3-oxo- |
| C.I. Pigment Yellow 13 | Butanamide, 2,2'-[(3,3'-dichloro[1,1'-biphenyl]-4,4'-diyl)bis(azo)]bis[N-(2,4-dimethylphenyl)-B-oxo |
| C.I. Pigment Orange 16 | Butanamide, 2,2'-[(3,3'-dimethoxy[1,1'-biphenyl]-4,4'-diyl)bis(azo)]bis[3-oxo-N phenyl- |
| C.I. Pigment Yellow 55 | Butanamide, 2,2'-[(3,3'-dichloro[1,1'-biphenyl]-4,4'-diyl)bis(azo)]bis[N-(4-methylphenyl)-3-oxo |
| C.I. Pigment Red 41 | 3H-Pyrazol-3-one, 4,4'-[(3,3'dimethoxy[1,1'-biphenyl]-4,4'-diyl)bis(azo)]bis[2,4-dihydro-5-methyl-2-phenyl- |

-continued

Pigments

| Generic Name | C.A. Index/Chemical Name |
|---|---|
| C.I. Pigment Orange 34 | 3H-Pyrazol-3-one, 4,4'-[(3,3'-dichloro[1,1'-biphenyl]-4,4'-diyl)bis(azo)]bis[2,4-dihydro-5-methyl-2-(4-methylphenyl)- |
| C.I. Pigment Blue 62 | 4,4'-Bis(diethylamino)benzophenone condensed with N-ethyl-1-naphthyl-amine in toluene with phosphorous oxychloride and converted to the copper ferrocyanide salt (PTMA salt in P. Blue 1) |
| C.I. Pigment Red 22 | 2-Naphthalenecarboxamide, 3-hydroxy-4-[(2-methyl-5-nitrophenyl)azo]-N-phenyl- |
| C.I. Pigment Red 170 | 2-Naphthalenecarboxamide, 4-[[(4-(aminocarbonyl)phenyl]azo]-N-(2-ethoxy-phenyl)-3-hydroxy- |
| C.I. Pigment Red 88 | Benzo[b]thiophen-3(2H)-on-e,4,7-dichloro-2-(4,7-dichloro-3-oxobenzo[b]th-ien-2(3H)-ylidene)- |
| C.I. Pigment Yellow 151 | A diazotized aniline derivative coupled with an acetoacetyl derivative of 5-aminobenzimidazolone |
| C.I. Pigment Red 184 | A diazotized substituted aniline coupled with a derivative of 3-hydroxy-2-naphthanilide |
| C.I. Pigment Blue 1:2 | Ethanaminium, N-[4-[[4-(diethylamino)phenyl] [4-(ethylamino)-1-1 naphthalenyl]methylene]-2,5-cyclohexadien-1-ylidene]-N-ethyl-, [orthosilicato(4-)] hexatriacontaoxo-dodecamolybdate(4)-(4:1) |
| C.I. Pigment Red 3 | 2-Naphthalenol, 1-[(4-methyl-2-nitro-phenyl)azo]- |
| C.I. Pigment Blue 15:1 | Copper,[29H,32H-phthalocyaninato(2-)-N$^{29}$, N$^{30}$, N$^{31}$, N$^{32}$]-, (SP-4-1)-or Copper, [chloro-29H, 31H-phthalocyaninato(2-1)-N$^{29}$, N$^{30}$, N$^{31}$, N$^{32}$]- |
| C.I. Pigment Red 23 | 2-Naphthalenecarboxamide, 3-hydroxy-4-[(2-methoxy-5-nitrophenyl)azo]-N-(3-nitrophenyl)- |
| C.I. Pigment Red 112 | 2-Naphthalenecarboxamide, 3-hydroxy-N-(2-methyl-phenyl)-4-[(2,4,5-tri-chlorophenyl)azo]- |
| C.I. Pigment Yellow 126 | A tetrazotized derivative of 3,3-dichlorobenzidene coupled with a derivative of acetoacetanilide |
| C.I. Pigment Red 169 | 3-Ethylamino-p-cresol condensed with phthalic anhydride, esterified with ethanol and a mineral acid, and converted to the copper ferrocyanide complex (chloride salt is C.I. Basic Red 1, PTMA salt is P. Red 81:1). |
| C.I. Pigment Orange 13 | 3H-Pyrazol-3-one, 4,4'-[(3,3'-dichloro[1,1'-biphenyl]-4,4'-diyl)bis(azo)]bis[2,4-dihydro-5-methyl-2-phenyl- |
| C.I. Pigment Red 10 | 2-Naphthalenecarboxamide, 4-[(2,5-dichlorophenyl)azo]-3-hydroxy-N-(4-methylphenyl)- |
| C.I. Pigment Blue 1:X | Ethanaminium, N-[4-[[4-(diethylamino)phenyl] [4-(ethylamino)-1-naphtha-lenyl]methylene]-2,5-cyclohexadien-1-ylidene]-N-ethyl-, molybdate phosphate |
| C.I. Pigment Yellow 42 | Iron oxide (Fe$_2$O$_3$) hydrate |
| C.I. Pigment Red 101 | Iron oxide (Fe$_2$O$_3$) |
| C.I. Pigment Brown 6 | Iron oxide (Fe$_2$O$_3$), some FeO and Fe$_2$O$_3$.H$_2$O |
| C.I. Pigment Brown 7 | Iron oxide (Fe$_2$O$_3$) plus varying amounts of clay |
| C.I. Pigment Brown 7:X | Fe$_2$O$_3$.x MnO$_2$ with varying amounts of clay |
| C.I. Pigment Black 11 | FeO.Fe$_2$O$_3$ |
| C.I. Pigment Metal 1 | Aluminum |
| C.I. Pigment Metal 2 | Copper, zinc |

This invention can be further illustrated by the following examples of preferred embodiments thereof, although it will be understood that these examples are included merely for purposes of illustration and are not intended to limit the scope of the invention unless otherwise specifically indicated. The starting materials are commercially available unless otherwise noted. All percentages are by weight unless otherwise noted. The units of inherent viscosity throughout this application are in deciliters/gram. As referred to herein, gloss was measured by ASTM Method D-523.

EXAMPLE I

A Water Drop/Face-to-Face block test (UCMWB) as described herein and a Water Drop Back/Face-to-Face wet block test (SRWB) as described herein were performed on the following:

Sample 1

A blend of 30% by weight of (a) hydroxyethyl-(methacrylate), (b) 10% by weight of a polyester with a composition of 82 mole % isophthalic acid, 18 mole % 5-sodiosulfoisophthalic acid, 54 mole % diethylene glycol and 46 mole % cyclohexanedimethanol, and (c) 60% by weight of styrene was prepared substantially as described herein. The results of the UCMWB and the SRWB tests are as follows:

Sample 2

A polyester with a composition of 91 mole % isophthalic acid, 9 mole % 5-sodiosulfoisophthalate, 75 mole % 1,4-cyclohexanedimethanol, and 25 mole % diethylene glycol based on the total of all acid and hydroxy moiety repeating units being equal to 200 mole % was prepared by the procedure generally described herein.

Sample 3

A polyester with a composition of 82 mole % isophthalic acid, 18 mole % 5-sodiosulfoisophthalate, 54 mole % 1,4-cyclohexanedimethanol, and 46 mole % diethylene glycol, based on the total of all acid and hydroxy moiety repeating units being equal to 200 mole % was prepared by the procedure generally described herein. The results are tabulated in Table III as follows:

TABLE III

| System | SRWB | Std. Dev.* | UCMWB | Std. Dev.* |
|---|---|---|---|---|
| Sample 1 | 2.92 | 0.66 | 3.00 | 0.45 |
| Sample 2 | 1.83 | 0.26 | 1.00 | 0.00 |
| Sample 3 | 2.08 | 0.38 | 1.17 | 0.26 |

*Std. Dev. - standard deviation

Sample 4

An overprint varnish containing 70 weight percent of a blend of 30 weight % polyester as described containing (a) 70 weight % of an aqueous dispersion of 30 weight % polyester as described in Sample 3 and 70% styrene, and (b) 30 weight % Joncryl 77, a styrenated acrylic as described herein.

TABLE IV

| Name | Wt. % | UCMWB | Gloss | Stab. |
|---|---|---|---|---|
| n-propanol | 2–6 | 3.1 | 35 | OK |
| isopropanol | 2–6 | | | |
| butanol | 2–6 | | | |
| EEH - EG, 2-ethylhexyl-ether | .5–3 | 3.2 | 33 | OK |
| glycerine | .5–3 | 3.2 | 37 | OK |

TABLE IV-continued

| Name | Wt. % | UCMWB | Gloss | Stab. |
|---|---|---|---|---|
| EB - Ethylene glycol | 1–5 | 3.1 | 27 | OK |
| DM butyl ether - Diethylene glycol monomethyl ether | 1–5 | 3.2 | 32 | OK |
| DB - diethylene glycol, monobutyl ether | 1–5 | 3.4 | 26 | OK |
| propylene glycol | 1–5 | 2.7 | 39 | OK |
| ethyl lactate | 1–3 | 3 | 28 | OK |
| butyl lactate | 1–3 | 1.9 | 28 | OK |
| propylene glycol | 1 | 3.2 | 29.2 | OK |
|  | 5 | 2.7 | 39 | OK |

Anything above 2.5 UCMWB is considered to be good. Anything above 30 gloss is considered to be good.
Each cosolvent listed was compared to an overprint substantially as described in Example I, Sample 4, having a UCMWB rating of 1 and a gloss rating of 50.

TABLE V

Viscosity Modifiers

| Name | Chem. Type | Range | UCMWB | Gloss | Stab. | Comparison |
|---|---|---|---|---|---|---|
| DSX 1514[1] |  | 1.5 |  |  | OK |  |
| Acrysol RM 825[2] |  | .5–1 |  |  | .5 OK |  |
| Carbowax 20M[3] |  | .25–1 |  |  |  |  |

[1]Purchased from Henkel Corporation, Ambler, PA 19002 (prop. blend)
[2]Purchased from Rohm & Haas Company, Philadelphia, PA 19105 (aqueous blend of polyurethane resin/diethylene glycol monobutylether)
[3]Purchased from Union Carbide, Danbury, CT 06817-0001 (oxyalkylene polymer)

TABLE VI

| Name | Range | UCMWB | Gloss | Stab. |
|---|---|---|---|---|
| Triton CF-10 | 0.5–4.0 | 1.4–1.0 | 35–51 | OK |
| Surf 104PA | 0.5–2.0 | 1.8 | 46 | OK |
| Surf 104PA | 0.5–2.0 | 2.3 | 48 | OK |
| Surf 340 | 0.5–3.0 | 3.1 | 44 | OK |
| Surf 350 | 0.5–3.0 | 3.3 | 49 | OK |
| Surf 420 | 0.5–2.0 | 2.3 | 50 | OK |
| Surf 440 | 0.5–3.0 | 2.8 | 50 | OK |
| Triton X-15 | 0.5–2.0 | 2.4 | 49 | OK |
| Triton X100 | 0.5–2.0 | 1.5 | 52 | OK |
| Silwet 7602 | 0.25–1.0 | 1.3 | 47 | OK |
| Mazawet DF | 0.5–2.0 | 1.6 | 52 | OK |
| Fluorad | 0.1–0.5 | 1.6 | 44 | OK |
| Surf 465 | 0.5–3.0 | * |  | OK |
| Surf 350 |  |  |  |  |
| .5 |  | 2.1 | 47 | OK |
| 2 |  | 3.0 | 45 | OK |
| 3 |  | 3.2 | 42 | OK |

Each surfactant listed was compared to an overprint substantially as described in Example I, Sample 4, having a UCMWB rating of 1 and a gloss rating of 50.

TABLE VII

Copolymers (5, 10 and 25%) based on solids

| Name | Range | UCMWB | Gloss | Stab. |
|---|---|---|---|---|
| J77 | 5, 10 & 25% | 1.9 | 47 | OK |
| Joncryl 585 | 5, 10 & 25% | 1.8 | 42 | OK |
| Sequa 8010 | 5, 10 & 25% | 1.5 | 42 | OK |
| Sequa 3000AF | 5, 10 & 25% | 2.7 | 42 | Unstable |
| Jonrez E-2050 | 5, 10 & 25% | 2.1 | 45 | OK |
| Hydantoin | 5, 10 & 25% | 3 | 41 | OK |
| Polyester of Example 1, Sample 3 | 5, 10 & 25% | 2 | 43 | OK |
| Hydantoin |  |  |  |  |
| 5% |  | 3 | 41 | OK |
| 10% |  | 1.5 | 46 | OK |
| 25% |  | 1 | 56 | Gelled over |

Each copolymer listed was compared to an overprint substantially as described in Example I, Sample 4, having a UCMWB rating of 1 and a gloss rating of 50.

In the results of the evaluations conducted, a rating scale was employed to judge best and worst results. The numerical designations are 1–4 where 4 is for best results and 1 is for the worst results. Six replications were made for each test.

The UCMWB test procedure is as follows:

A Winston red printed but unoverprinted sample of label substrate (7"×12" dimensions) is placed in a K-coater drawdown apparatus. An RK #1 rod is placed into position and the stability weights lowered onto the sled. The speed setting is set to 5 and then an even bead of overprint is applied to the substrate via a transfer pipet. The drawdown is then prepared by turning the setting knob to the forward position. The overprinted sample is then dried in a forced air convection oven for 3–5 seconds at a temperature of 100° C. Three samples of 3"×6" are obtained from each drawdown (usually six samples required). Each sample is folded in half with the face (printed) side being positioned face-to-face. The samples are randomized to help maintain uniform experimental conditions. A piece of aluminum foil (3"×3") is placed on the bottom and the folded overprinted sample placed on top; then one drop of water is placed on the inside of the folded sample and a piece of aluminum foil is placed on the top. The previous step is repeated until all the samples are in the test stack. A piece of plexiglas (3"×3") is placed on the top and bottom of the stack of samples. The samples are placed in a 60° C. oven. A nine pound weight is placed onto the sample stack. The samples are removed from the oven after a period of 16 hours. The samples are allowed to equilibrate to room temperature for 30 minutes and then rated to determine physical performance.

| Rating Scale | | |
|---|---|---|
| # | Score | Comments |
| 4.0 | Excellent | No discoloration or damage |
| 3.0 | Good | Slight discoloration or damage |
| 2.0 | Poor | Moderate destruction |
| 1.0 | Failure | Complete destruction |

The SRWB test procedure is as follows:

A blue acrylic printed but unoverprinted sample of coated substrate (7"×12" dimensions) is placed in a K-coater drawdown apparatus. An RK #1 rod is placed into position and the stability weights lowered onto the sled. The speed setting is set to 5 and then an even bead of overprint is applied to the substrate via a transfer pipet. The drawdown is then prepared by turning the setting knob to the forward position. The overprinted sample is then dried in a forced air convection oven for 3–5 seconds at a temperature of 100° C. Three samples of 3"×6" are obtained from each drawdown (usually six samples required). Each sample is folded in half with the face (printed) side being positioned face-to-face. The samples are randomized to help maintain uniform experimental conditions. A piece of aluminum foil (3"×3") is placed on the bottom and the folded overprinted sample placed on top; one drop of water is placed on the outside of the folded sample and a piece of aluminum foil is placed on the top. The previous step is repeated until all the samples are in the test stack. A piece of plexiglas (3"×3") is placed on the top and bottom of the stack of samples. The samples are placed in a 57° C. oven. A nine pound weight is placed onto the sample stack. The samples are removed from the oven after a period of 16 hours. The samples are allowed to equilibrate to room temperature for 30 minutes and then rated to determine physical performance.

| Rating Scale | | |
| --- | --- | --- |
| # | Score | Comments |
| 4.0 | Excellent | No discoloration or damage |
| 3.0 | Good | Slight discoloration or damage |
| 2.0 | Poor | Moderate destruction |
| 1.0 | Failure | Complete destruction |

EXAMPLE II—Ink Formulation

The following is a preferred ink formulation:

| Black | % (wt.) | % (DB) |
| --- | --- | --- |
| Sample 5 | 24.4 | 9.76 |
| Dantoin 736 - 5,5-dimethylhydantoin | 6.4 | 4.80 |
| Carbon Black CSX 220 Millbase | 44.0 | 12.00 |
| Deionized H₂O (DIH₂O) | 19.7 | |
| Surfynol 104 PA | 0.3 | |
| Resolv | 2.0 | |
| Glycerine | 3.0 | |
| D65 silicone defoamer | 0.1 | |
| Tektamer 38LV biocide | 0.1 | |

Sample 5 is a blend of (a) 20% by weight of a polyester substantially as described in Example I, Sample 3, (b) 50% by weight of styrene, and (c) 30% by weight of hydroxyethyl(meth)acrylate. The ink formulation was prepared using the following procedure:

Mixing Procedure

Materials must be blended under continuous agitation based on the order of the formula in a suitable container. Weigh and add dispersion as described in Example II into the container; then start agitator; add Dantoin 736; add Carbon Black CSX-220 Millbase; add deionized H₂O; add Surfynol 104PA; add Resolv; add glycerine; add D65 silicone defoamer. Stir well before adding Tektamer 38 LV. Continue mixing. Next, filter the mixture through a 100 micron filter.

EXAMPLE III—Ink Formulation

| Black | % (wt.) | % (DB) |
| --- | --- | --- |
| Sample 5 (as described in Example II) | 37.4 | 14.96 |
| Jonrez E2050 styrene/acrylic copolymer | 9.0 | 4.32 |
| Carbon Black CSX 220 Millbase | 44.0 | 12.00 |
| Triton CF10 alkylaryl polyether surfactant | 1.0 | |
| Deionized H₂O | 5.4 | |
| Propylene glycol | 3.0 | |
| D65 silicone defoamer | 0.1 | |
| Tektamer 38LV biocide | 0.1 | |

The ink formulation was prepared using the procedure as described in Example II.

EXAMPLE IV—Ink Formulation

| Yellow | % (wt.) | % (DB) |
| --- | --- | --- |
| Sample 5 (as described in Example II) | 44.0 | 17.6 |
| Jonrez E2050 styrene/acrylic copolymer | 15.0 | 7.2 |
| Dispersion as described in Example I, Sample 3 | 10.0 | 3.3 |
| Yellow 14 Dispersion | 16.8 | 3.36 |
| Yellow 83 Dispersion | 3.7 | 1.18 |
| Triton CF10 alkylaryl polyether surfactant | 1.0 | |
| Deionized H₂O | 6.3 | |
| Propylene glycol | 3.0 | |
| D65 silicone defoamer | 0.1 | |
| Tektamer 38LV biocide | 0.1 | |

The ink formulation was prepared using the procedure as described in Example II.

EXAMPLE V—Ink Formulation

| Red | % (wt.) | % (DB) |
| --- | --- | --- |
| Sample 5 (as described in Example II) | 36.5 | 14.6 |
| Jonrez E2050 styrene/acrylic copolymer | 15.0 | 7.2 |
| Dispersion as described in Example I, Sample 3 | 5.0 | 1.65 |
| Red 184 Dispersion | 19.9 | 8.96 |
| Red 22 Millbase | 9.2 | 2.21 |
| Triton CF10 alkylaryl polyether surfactant | 1.0 | |
| Deionized H₂O | 10.2 | |
| Propylene glycol | 3.0 | |
| D65 silicone defoamer | 0.1 | |
| Tektamer 38LV biocide | 0.1 | |

The ink formulation was prepared using the procedure as described in Example II.

EXAMPLE VI—Ink Formulation

| Blue | % (wt.) | % (DB) |
| --- | --- | --- |
| Sample 5 (as described in Example II) | 35.2 | 14.1 |
| Jonrez E2050 styrene/acrylic copolymer | 7.0 | 3.36 |
| Dispersion as described in Example I, Sample 3 | 11.9 | 3.93 |
| Blue 15:3 Millbase | 29.7 | 10.40 |
| Triton CF10 alkylaryl polyether surfactant | 3.0 | |
| Deionized H₂O | 10.0 | |
| Propylene glycol | 3.0 | |
| D65 silicone defoamer | 0.1 | |
| Tektamer 38LV biocide | 0.1 | |

The ink formulation was prepared using the procedure as described in Example II.

From these results, it is apparent that Jonrez E2050 styrene/acrylic copolymer present in the ink formulation at a level of 5-30 percent by weight is preferred. Dantoin 736 present in the ink formulation at a level of 5-10 percent by weight is preferred.

From these results, it is apparent that Joncryl 77 styrene/acrylic copolymer present in the ink formulation at a level of 5-30 percent by weight is preferred. Dispersion as shown in Example I, Sample 3, present in the ink formulation at a level of 5-20 percent by weight is preferred. Dispersion containing 89 mole % isophthalic acid, 11 mole % 5-sodiosulfoisophthalic acid, 78.5 mole % diethylene glycol and 21.5 mole % cyclohexanedimethanol was prepared by the procedure generally described herein.

EXAMPLE 7

TABLE VIII

| Additive | A | B | C | D | E | F | G | H | I |
|---|---|---|---|---|---|---|---|---|---|
| Sample 1 of Example 1 | 60 | 60 | 60 | 60 | 60 | 60 | 60 | 60 | 60 |
| Joncryl 77 | 20 | 15 | | 5 | 25 | | | | 15 |
| Joncryl 87 | 15 | 20 | 20 | 15 | 10 | 15 | 10 | 25 | 10 |
| Jonrez 2050 | | | 15 | 5 | | 20 | 25 | | 10 |
| DI Water | 5 | 5 | 5 | 5 | 5 | 5 | 15 | | 5 |
| Transparency Rating | 1 | 1 | 3 | 2 | 2 | 4 | 4 | 1 | 3 |
| Union Camp Block Rating | 4 | 4 | 1 | 3 | 3 | 1 | 1 | 1 | 3.5 |
| Gloss (60 Degree) | 2 | 2 | 3 | 3 | 3 | 4 | 4 | 1 | 3 |

EXAMPLE VIII

| General Formulation for Overprint Varnish | |
|---|---|
| Sample 1 of Example I (10/60/30) | 50.0 |
| Joncryl 77 | 16.7 |
| Joncryl 87 | 10.0 |
| Jonrez E-2050 | 6.7 |
| Surf 104PA | 0.5 |
| D65 defoamer[1] | 0.1 |
| SL 600 wax[2] | 1.0 |
| Liquitron 435[3] | 0.5 |
| Deionized H$_2$O | 14.3 |
| Tektamer | 0.1 |
| DSX-1514 | 0.1 |

[1]Silicone defoamer, Dow Corning, Midland, MI 48686
[2]Micronized powder wax, Daniel Products, Jersey City, NJ 07304
[3]Polyethylene emulsion, Carroll Scientific, Countryside, IL 60525

The above components are added into the mixture in the listed order with mixing occurring.

TABLE IX

| Name | Range | UCMWB | Gloss | Stab. |
|---|---|---|---|---|
| Triton CF-10 | 0.5–4.0 | 1.4–1.0 | 35–51 | OK |
| Surf 104PA | 0.5–2.0 | 1.8 | 46 | OK |
| Surf 104A | 0.5–2.0 | 2.3 | 48 | OK |
| Surf 340 | 0.5–3.0 | 3.1 | 44 | OK |
| Surf 350 | 0.5–3.0 | 3.3 | 49 | OK |
| Surf 420 | 0.5–2.0 | 2.3 | 50 | OK |
| Surf 440 | 0.5–3.0 | 2.8 | 50 | OK |
| Triton X-15 | 0.5–2.0 | 2.4 | 49 | OK |
| Triton X100 | 0.5–2.0 | 1.5 | 52 | OK |
| Silwet L7602 | 0.25–1.0 | 1.3 | 47 | OK |
| Mazawet DF | 0.5–2.0 | 1.6 | 52 | OK |
| Fluorad FC-430 | 0.1–0.5 | 1.6 | 44 | OK |
| Surf 465 | 0.5–3.0 | * | | OK |
| Surf 350 | | | | |
| .5 | | 2.1 | 47 | OK |
| 2 | | 3.0 | 45 | OK |
| 3 | | 3.2 | 42 | OK |

*Each surfactant listed was compared to an overprint substantially as defined in Example I, Sample 4, having a UCMWB rating of 1 and a gloss rating of 50.

TABLE X

| Name | % Range | UCMWB | Gloss @ 60° | Stab. |
|---|---|---|---|---|
| n-Propanol | 2–6 | 3.1 | 35 | OK |
| Isopropanol | 2–6 | | | |
| Butanol | 2–6 | | | |
| Ethylene Glycol 2-Ethylhexyl Ether | .5–3 | 3.2 | 33 | OK |
| Glycerine | .5–3 | 3.2 | 37 | OK |
| Ethylene Glycol Monobutyl Ether | 1–5 | 3.1 | 27 | OK |
| Ethylene Glycol Monopropyl Ether | 1–5 | 3.2 | 32 | OK |
| Diethylene Glycol Monomethyl Ether | 1–5 | 3.4 | 26 | OK |
| Propylene glycol | 1–5 | 2.7 | 39 | OK |
| Ethyl lactate | 1–3 | 3 | 28 | OK |
| Butyl lactate | 1–3 | 1.9 | 28 | OK |
| Diethylene Glycol | 2–5 | | | |

TABLE X-continued

| Name | % Range | UCMWB | Gloss @ 60° | Stab. |
|---|---|---|---|---|
| Monomethyl Ether Propylene glycol | 1 | 3.2 | 29.2 | OK |
| | 5 | 2.7 | 39 | OK |

Anything above 2.5 UCM WB is good. Anything above 30 gloss is good.

Each cosolvent listed was compared to an overprint substantially as described in Example I, Sample 4, having a UCMWB rating of 1 and a gloss rating of 50.

TABLE XI

| Name | % Range | UCMWB | Gloss @ 60° | Stab. |
|---|---|---|---|---|
| DSX 1514[1] | 1.5 | | | OK |
| Acrysol RM 825[2] | .5–1 | | .5 | OK |
| Carbowax 20M[3] | .25–1 | | | |

[1]Purchased from Henkel Corporation, Ambler, PA 19002 (prop. blend)
[2]Purchased from Rohm & Haas Company, Philadelphia, PA 19105 (aqueous blend of polyurethane resin/diethylene glycol monobutylether)
[3]Purchased from Union Carbide, Danbury, CT 06817-0001 (oxyalkylene polymer)

The invention has been described in detail with particular reference to preferred embodiments thereof, but it will be understood that variations and modifications can be effected within the spirit and scope of the invention. Moreover, all patents, patent applications (published or unpublished, foreign or domestic), literature references or other publications noted above are incorporated herein by reference for any disclosure pertinent to the practice of this invention.

We claim:

1. An ink composition comprising:
   (A) about 60 to about 95 weight % of an aqueous dispersion comprising:
   (1) a polyester (E) consisting essentially of repeat units from about 5 to about 40% by weight of a linear, water-dissipatable polymer having carbonyloxy linking groups in the linear molecular structure wherein up to 80% of the linking groups may be carbonylamido linking groups, the polymer having an inherent viscosity of at least about 0.1 measured in a 60/40 parts by weight solution of phenol/tetrachloroethane at 25° C. and at a concentration of about 0.25 gram of polymer in 100 ml of the solvent, the polymer containing substantially equimolar proportions of acid equivalents (100 mole percent) to hydroxy and amino equivalents (100 mole percent), the polymer comprising the reaction products of (a), (b), (c) and (d) from the following components or ester forming or esteramide forming derivatives thereof:
   (a) at least one difunctional aromatic, saturated aliphatic or saturated alicyclic dicarboxylic acid;

(b) from about 4 to about 25 mole percent, based on a total of all acid and hydroxyl equivalents being equal to 200 mole percent, of at least one difunctional sulfomonomer containing at least one metal sulfonate group attached to aromatic nucleus wherein the functional groups are hydroxy or carboxyl;

(c) at least one difunctional reactant selected from a glycol or a mixture of a glycol and diamine having two —NRH groups, the glycol containing two —CH$_2$—OH groups; and (d), from none to at least one difunctional reactant selected from a hydroxycarboxylic acid having one —CR$_2$—OH, an aminocarboxylic acid having one —NRH group, an aminoalcohol having one —CR$_2$—OH group and one —NRH or mixtures thereof, wherein each R is an H atom or an alkyl group of 1 to 4 carbon atoms; and (2) about 95 to about 60% by weight of a polymer (F) having repeat units from (a) about 20 to about 80% by weight of a polymer comprising repeat units from styrene or one or more derivatives of styrene;

(b) about 15 to about 50% by weight of hydroxyalkyl (meth) acrylate; and (c) about 0 to about 60% by weight of alkyl (meth)acrylate, said aqueous dispersion containing about 95 to about 60% by weight of said polymer (F) and about 5 to about 40% by weight of said polyester (E), both said percentages being based on the combined weight of polyester (E) and polymer (F); and (B) about 5 to 40% by weight of a copolymer (G) consisting of (1) about 10 to 65 weight percent of polyester (E), based on the weight of B(1) or polyester (E) plus (B)(2) plus (B)(3);

(2) an acrylic polymer in an amount of about 15 to 30 percent, based on the total weight of components (B)(1) and (B)(2), said acrylic polymer being compatible with the water-dissipatable polyester at a maximum acrylic polymer concentration of about 60/40 weight percent of the total acrylic/polyester polymer solids, and (3) a water-dissipatable vinyl polymer in an amount of about 20 to 60 weight percent, based on the weight of (B)(1) plus (B)(2) plus (B)(3), said vinyl polymer being compatible with the water-dissipatable polyester at a maximum vinyl polymer concentration of about 60/40 weight percent of the total vinyl/polyester polymer solids, or (C) about 5.0 to about 25.0 weight % of a hydantoin-formaldehyde resin.

2. The ink composition of claim 1 wherein said glycol containing two groups of said polyester (E) of component 1(A) consists of at least 15 mole percent based on the total mole percent of hydroxy or hydroxy and amino equivalents, is a poly(ethylene glycol) having the structural formula:

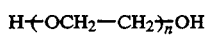

n being an integer of between about 2 to about 20.

3. The ink composition of claim 1 wherein said glycol containing two groups of said polyester (E) of component 1(A) consists of from about 0.1 to less than about 15 mole % is a poly(ethylene glycol) having the structural formula

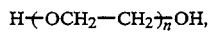

n being an integer of between 2 and about 500, and with the proviso that the mole % of said poly(ethylene glycol) within said range is inversely proportional to the quantity of n within said range.

4. The ink composition of claim 1 wherein said hydroxyalkyl (meth)acrylate is present at 15–40% by weight of total solids present in component 1(A) of said composition.

5. The ink composition of claim 4 wherein said hydroxyalkyl (meth)acrylate is present at 20–30% by weight.

6. The ink composition of claim 1 wherein component 1(A) has a particle size of about ≦300 nm.

7. The ink composition of claim 6 wherein component 1(A) has a particle size of about 40 nm to about 200 nm.

8. The ink composition of claim 1 wherein said hydroxyalkylacrylate is hydroxypropylacrylate or hydroxyethylacrylate.

9. The ink composition of claim 1 wherein said hydroxyalkyl methacrylate is 2-hydroxyethylmethacrylate.

10. The ink composition of claim 1 having a solids content of about 25 to about 45 weight % based on total weight of component 1(A).

11. The ink composition of claim 1 wherein component 1(A)(1) has a solids content of from about 5 to about 40 weight % based on dry solids.

12. The ink composition of claim 11 wherein component 1(A)(1) has a solids content of from about 10 to about 30 weight % based on dry solids.

13. The ink composition of claim 1 wherein said sulfomonomer is sodiosulfoisophthalic acid.

14. The ink composition of claim 1 wherein said dicarboxylic acid comprises isophthalic acid.

15. The ink composition of claim 1 wherein said glycol comprises a poly(ethylene glycol).

16. The ink composition of claim 1 wherein said polyester (E) has repeat units from isophthalic acid, sodiosulfoisophthalic acid, diethylene glycol, and another glycol selected from at least one of ethylene glycol and 1,4-cyclohexanedimethanol, and another polymer containing at least 20% by weight of repeat units from styrene or one or more derivatives of styrene, and at least 15% by weight of hydroxyalkyl (meth)acrylate.

17. The ink composition of claim 1 wherein said polymer (F) comprises repeating units from 0 to about 80 weight % of one or more comonomers selected from the group consisting of ethylene, acrylic acid, methacrylic acid, acrylic and methacrylic acid esters, acrylamides, unsaturated dicarboxylic acid diesters, vinyl chloride and maleic anhydride.

18. The ink composition of claim 1 wherein said polymer (F) comprises repeating units from at least 20% by weight of one or more comonomers selected from styrene, methylmethacrylate, ethylhexylacrylate and butylacrylate.

19. The ink composition of claim 1 wherein said polyester (E) has an inherent viscosity of from about 0.28 to about 0.38, an acid moiety of from about 75 to about 92 mole % isophthalic acid and from about 25 to about 8 mole % 5-sodiosulfoisophthalic acid, and a glycol moiety of from about 45 to about 75 mole % diethylene glycol and from about 55 to about 25 mole % 1,4-cyclohexanedimethanol or ethylene glycol or mixtures thereof.

20. The ink composition of claim 19 wherein said acid moiety comprises from about 80 to about 83 mole % isophthalic acid and conversely from about 20 to about 17 mole % 5-sodiosulfoisophthalic acid, and said glycol moiety comprises from about 52 to about 56 mole % diethylene glycol and conversely from about 48 to about 44 mole % 1,4-cyclohexanedimethanol.

21. The ink composition of claim 1 wherein said acrylic polymer of component (1)(B) is compatible with said polyester (E) at an acrylic concentration of at least 30/70 based on the weight of a blend of said acrylic polymer of component (1)(B)/said polyester (E), and said vinyl polymer of component (1)(B) is compatible with polyester (E) at a vinyl concentration of at least 30/70 based on the weight of a blend of said vinyl polymer of component (1)(B)/said polyester (E).

22. The ink composition of claim 1 wherein said acrylic polymer of component (1)(B) is compatible with said polyester (E), at an acrylic concentration of at least 40/60 based on the weight of a blend of said acrylic polymer of component (1)(B)/said polyester (A), and said vinyl polymer of component (1)(B) is compatible with said polyester (A) at a vinyl concentration of at least 50/50 based on the weight of a blend of said vinyl polymer of component (1)(B)/said polyester (E).

23. The ink composition of claim 1 wherein component 1(B)(3) comprises at least one acrylic polymer having a molecular weight of at least about 200,000, an acid number of less than about 55, and a Tg of greater than 0° C.; and component (1)(B)(3) comprises at least one vinyl polymer having a molecular weight of 4,000–50,000, a Tg of about 0°–100° C. and a halide content of about 20–50 weight percent.

24. The ink composition of claim 1 wherein said acrylic polymer of component 1(B)(2) comprises repeating units of the formula:

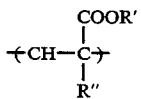

wherein R' is a straight, branched, or cyclic alkyl group of 1 to 10 carbon atoms, substituted with 0 to 2 substituents selected from the group consisting of $C_1$–$C_6$ alkoxy and halogen; and R" is H or methyl; and component (1)(B)(3) comprises repeating units of the formula

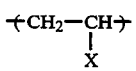

wherein X is halo.

25. The ink composition of claim 24 wherein R' is H, methyl, ethyl, propyl, isopropyl, n-butyl, sec-butyl, isobutyl, tert-butyl, hexyl, heptyl, 2-ethylhexyl, 2-ethylbutyl, dodecyl, hexadecyl, 2-ethoxyethyl, or cyclohexyl; and X is Cl.

26. The ink composition of claim 24 wherein said acrylic polymer further comprises repeating units of the formula:

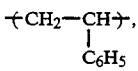

said vinyl polymer further comprises one or more repeating units of the formula

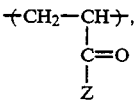

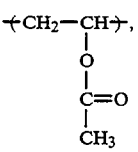

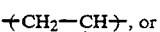

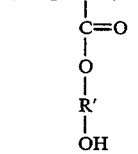

wherein Z is $NH_2$ or OH; R' is as previously defined; and Y is a polycarboxylic acid-containing $C_1$ to $C_{20}$ alkyl chain.

27. The ink composition of claim 1 wherein component (1)(B)(2) is present in an amount effective to increase the block resistance or water resistance properties of the blend when formulated into an ink composition; and wherein component (1)(B)(3) is present in an amount effective to increase the alcohol resistance properties of the composition.

28. The ink composition of claim 1 wherein (1)(B)(1) is present in an amount of about 50%, component (1)(B)(2) is present in an amount of about 20%, and component (1)(B)(3) is present in an amount of about 30%.

29. The ink composition of claim 1 wherein component (1)(B)(1) is in the form of an aqueous composition comprising 26 to 38 weight percent of polyester material with the remainder of the aqueous composition being water or an aqueous solution.

30. The ink composition of claim 1 wherein the hydantoin component of said component (1)(C) has the following structure:

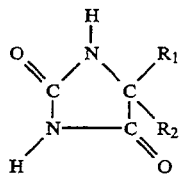

wherein $R_1$ and $R_2$ are selected from the group consisting of hydrogen or monovalent aliphatic groups and cycloaliphatic groups or $R_1$ and $R_2$ may together form a divalent aliphatic or cycloaliphatic group.

31. The ink composition of claim 1 wherein said hydantoin compound is a 5,5-dialkylhydantoin.

32. The ink composition of claim 31 wherein said hydantoin compound is 5,5-dimethylhydantoin.

33. The ink composition of claim 1 wherein said the formaldehyde useful in forming the hydantoinformaldehyde resin is in the form of an aqueous solution of formaldehyde, paraformaldehyde or anhydrous formaldehyde gas.

34. The ink composition of claim 1 coated onto a substrate selected from metal foil, newsprint, bleached and unbleached Kraft paper, clay coated paper, glass, calendered paper, stainless paper, paper board, and films or other substrates of polyester, polycarbonate, polyolefin, cellulose ester, regenerated cellulose, poly(vinylidiene chloride), polyamide, polyolefin, or polystyrene.

35. The ink composition of claim 34 wherein said coating is water-insoluble and is coated or printed onto said substrate wherein water has evaporated and a portion of the initial metal cations of the water solubilizing sulfonate groups of the polymeric material has been replaced with an insolubilizing cation.

36. The ink composition of claim 35 wherein the weight ratio of water to total acetylenic surfactant is from about 10 to about 180.

37. The ink composition of claim 36 wherein said acetylenic surfactant is selected from 2,4,7,9-tetramethyl-5-decyn-4,7-diol; 3,5-dimethyl-1-hexyn-3-ol; 3,6-dimethyl-4-octyne-3,6-diol, and an ethylene oxide adduct thereof.

38. The ink composition of claim 1 wherein said colorant is one or a mixture of the following color index materials: C.I. Pigment Yellow 17, C.I. Pigment Blue 27, C.I. Pigment Red 49:2, C.I. Pigment Red 81:1, C.I. Pigment Red 81:3, C.I. Pigment Red 81:x, C.I. Pigment Yellow 83, C.I. Pigment Red 57:1, C.I. Pigment Red 49:1, C.I. Pigment Violet 23, C.I. Pigment Green 7, C.I. Pigment Blue 61, C.I. Pigment Red 48:1, C.I. Pigment Red 52:1, C.I. Pigment Violet 1, C.I. Pigment White 6, C.I. Pigment Blue 15, C.I. Pigment Yellow 12, C.I. Pigment Blue 56, C.I. Pigment Orange 5, C.I. Pigment Black 7, C.I. Pigment Yellow 14, C.I. Pigment Red 48:2, C.I. Pigment Blue 15:3, C.I. Pigment Yellow 1, C.I. Pigment Yellow 3, C.I. Pigment Yellow 13, C.I. Pigment Orange 16, C.I. Pigment Yellow 55, C.I. Pigment Red 41, C.I. Pigment Orange 34, C.I. Pigment Blue 62, C.I. Pigment Red 22, C.I. Pigment Red 170, C.I. Pigment Red 88, C.I. Pigment Yellow 151, C.I. Pigment Red 184, C.I. Pigment Blue 1:2, C.I. Pigment Red 3, C.I. Pigment Blue 15:1, C.I. Pigment Red 23, C.I. Pigment Red 112, C.I. Pigment Yellow 126, C.I. Pigment Red 169, C.I. Pigment Orange 13, C.I. Pigment Red 1-10, 12, C.I. Pigment Blue 1:X, C.I. Pigment Yellow 42, C.I. Pigment Red 101, C.I. Pigment Brown 6, C.I. Pigment Brown 7, C.I. Pigment Brown 7:X, C.I. Pigment Black 11, C.I. Pigment Metal 1, or C.I. Pigment Metal 2.

39. The ink composition of claim 38 wherein said pigment material is present in a weight ratio with respect to total polyester materials of from about 1/10 to about 2/1 blended with said polyester materials.

40. The ink composition of claim 1 further comprising from 0.1 to about 90 weight % of water.

41. The ink composition of claim 1 further comprising from about 0 to about 12.0 weight % of a wax material.

42. The ink composition of claim 41 further comprising from about 0 to about 6.0 weight % of a cosolvent.

43. The ink composition of claim 42 wherein said cosolvent is propylene glycol.

44. The ink composition of claim 42 wherein said cosolvent is glycerine.

* * * * *